(12) United States Patent
Mody et al.

(10) Patent No.: US 12,530,233 B2
(45) Date of Patent: Jan. 20, 2026

(54) TASK SCHEDULING FOR SYSTEMS INCLUDING MULTIPLE HARDWARE ACCELERATORS

(71) Applicant: TEXAS INSTRUMENTS INCORPORATED, Dallas, TX (US)

(72) Inventors: Mihir Mody, Bangalore (IN); Niraj Nandan, Plano, TX (US); Rajasekhar Allu, Plano, TX (US); Ankur Ankur, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 18/175,333

(22) Filed: Feb. 27, 2023

(65) Prior Publication Data

US 2023/0385114 A1 Nov. 30, 2023

Related U.S. Application Data

(60) Provisional application No. 63/345,937, filed on May 26, 2022.

(51) Int. Cl.
*G06F 9/50* (2006.01)
*G06F 9/48* (2006.01)
*G06F 9/54* (2006.01)

(52) U.S. Cl.
CPC .......... *G06F 9/5027* (2013.01); *G06F 9/4881* (2013.01); *G06F 9/544* (2013.01)

(58) Field of Classification Search
CPC .............................. G06F 9/5027; G06F 9/4881
See application file for complete search history.

(56) References Cited

U.S. PATENT DOCUMENTS

| | | | |
|---|---|---|---|
| 2016/0011907 A1* | 1/2016 | Moyer | G06F 9/4843 |
| | | | 718/104 |
| 2019/0087233 A1* | 3/2019 | Liu | G06F 9/485 |
| 2020/0210301 A1* | 7/2020 | Nandan | G06F 11/2242 |
| 2020/0210351 A1* | 7/2020 | Mody | H04N 5/77 |
| 2020/0257547 A1* | 8/2020 | Oshins | G06F 9/45558 |
| 2021/0209041 A1* | 7/2021 | Nandan | G06F 9/4881 |
| 2021/0326174 A1* | 10/2021 | Nandan | G06F 9/3836 |
| 2022/0066760 A1* | 3/2022 | Chang | G06N 3/063 |
| 2022/0283847 A1* | 9/2022 | Persson | G06F 12/10 |

* cited by examiner

*Primary Examiner* — Michael J Metzger
(74) *Attorney, Agent, or Firm* — Xianghui Huang; Frank D. Cimino (57) ABSTRACT

A data processing device includes a plurality of hardware accelerators, a scheduler circuit, and a blocking circuit. The scheduler circuit is coupled to the plurality of hardware accelerators, and includes a plurality of hardware task schedulers. Each hardware task scheduler is coupled to a corresponding hardware accelerator, and is configured to control execution of the task by the hardware accelerator. The blocking circuit is coupled to the plurality of hardware accelerators and configured to inhibit communication between a first hardware accelerator and a second hardware accelerator of the plurality of hardware task schedulers.

20 Claims, 9 Drawing Sheets

TASK SCHEDULING FOR SYSTEMS INCLUDING MULTIPLE HARDWARE ACCELERATORS

RELATED APPLICATIONS

This application hereby claims the benefit of and priority to U.S. Provisional Patent Application No. 63/345,937, titled "FLEXCONNECT: SUPER PIPELINE", filed on May 26, 2022 and which is hereby incorporated by reference in its entirety.

This application is related to U.S. Application, entitled "HARDWARE EVENT TRIGGERED PIPELINE CONTROL," filed herewith on Feb. 27, 2023, which claims the benefit of U.S. Provisional Patent Application No. 63/345, 940, entitled "HARDWARE EVENT TRIGGERED PIPELINE CONTROL," filed May 26, 2022, both of which are hereby incorporated by reference in their entirety for all purposes.

TECHNICAL BACKGROUND

A new class of embedded safety systems, referred to as advanced driver assistance systems (ADAS), has been introduced into automobiles to reduce human operation error. Such systems may provide functionality such as rear-view facing cameras, electronic stability control, and vision-based pedestrian detection systems. Many of these systems rely on computer vision processing of images captured by one or more cameras to detect objects in the field of view of the one or more cameras. The vision processing may include, for example, image processing, lens distortion correction, noise filtering, edge detection, motion detection, image scaling, etc.

Tasks implementing various parts of the vision processing of the images may be performed on hardware accelerators and/or by software executing on programmable processors, e.g., digital signal processors and general-purpose processors. Current hardware thread schedulers provide for scheduling of a single thread of tasks to be executed on hardware accelerators but do not provide the flexibility needed for image and vision processing in ADAS.

OVERVIEW

In an implementation, a data processing device includes a plurality of hardware accelerators, a scheduler circuit, and a blocking circuit. The scheduler circuit is coupled to the plurality of hardware accelerators, and includes a plurality of hardware task schedulers. Each hardware task scheduler is coupled to a corresponding hardware accelerator, and is configured to control execution of the task by the hardware accelerator. The blocking circuit is coupled to the plurality of hardware accelerators and configured to inhibit communication between a first hardware accelerator and a second hardware accelerator of the plurality of hardware accelerators.

In another implementation, a scheduler circuit for a data processing device includes a plurality of hardware accelerators, each hardware accelerator configured to execute a task. The scheduler circuit also includes a plurality of hardware task schedulers. Each hardware task scheduler of the plurality of hardware task schedulers is coupled to a corresponding hardware accelerator and is configured to control execution of the task by the hardware accelerator.

The scheduler circuit further includes a blocking circuit coupled to the plurality of hardware accelerators that is configured to inhibit communication between a first hardware accelerator and a second hardware accelerator of the plurality of hardware accelerators.

The scheduler circuit is configured to concurrently control a first hardware accelerator to execute a task from a first thread of tasks requiring a first configuration of the first hardware accelerator, and a second hardware accelerator to execute a task from a second thread of tasks requiring a second configuration of the second hardware accelerator different from the first configuration.

In a further embodiment, a method for executing concurrent threads on a read scheduler circuit (comprising a plurality of hardware task schedulers, included in a data processing device including a plurality of hardware accelerators), includes configuring a first thread on a first hardware task scheduler included in the scheduler circuit. The first thread includes tasks requiring a first configuration of a first hardware accelerator comprised in the data processing device. The first hardware task scheduler is coupled with, and configured to control, the first hardware accelerator.

The method also includes configuring a second thread on a second hardware task scheduler included in the scheduler circuit. The second thread includes tasks requiring a second configuration of a second hardware accelerator comprised in the data processing device. The second configuration of the second hardware accelerator is different from the first configuration of the first hardware accelerator. The second hardware task scheduler is coupled with, and configured to control, the second hardware accelerator.

The method further includes initiating execution of the first thread by the first hardware accelerator, and concurrently initiating execution of the second thread by the second hardware accelerator.

The scheduler circuit includes a blocking circuit coupled to the plurality of hardware accelerators and configured to inhibit communication between a first hardware accelerator and a second hardware accelerator of the plurality of hardware accelerators.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following descriptions of various example embodiments and implementations of a data processing pipeline. In these various examples, embodiments of the disclosure provide for flexible scheduling of tasks in an embedded computer vision system having multiple hardware accelerators. More specifically, a software configurable hardware thread scheduler (HTS) for such an embedded computer vision system is provided. In some embodiments, the HTS includes functionality to manage execution of a thread including one or more tasks performed on hardware accelerators and one or more tasks performed in software. In some embodiments, the HTS may be configured to manage execution of concurrent threads.

The HTS circuit is a messaging layer for low-overhead synchronization of parallel computing tasks and Direct Memory Access (DMA) transfers, and is independent from the host processor. It provides the capability of autonomous frame-level processing for the accelerator sub-system by exchanging notifications once producers of data have readied the data for the respective consumer(s) in a manner that allows the producers and consumers to operate in a pipelined manner. In this regard, the HTS circuit defines various aspects of synchronization and data sharing between hardware accelerators. Based on various producer and consumer dependencies, the HTS circuit ensures that a task starts only when input data and adequate space to write output data is available. In addition, it also provides for pipe-up, debug, and abort functions of the hardware accelerators (HWAs). The HTS circuit also reduces power consumption by generating an active clock window for HWA clocks when no task is scheduled.

Figure 1:
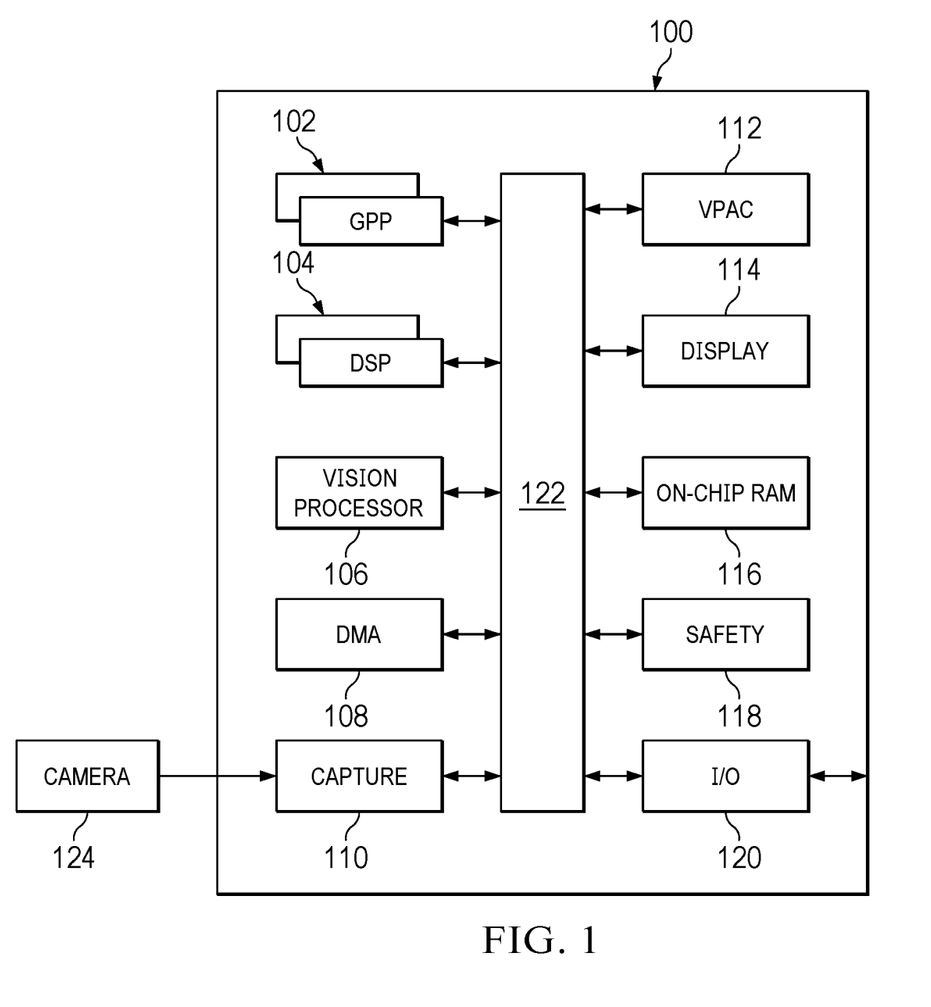
FIG. 1 illustrates a high-level block diagram of an example multiprocessor System-On-a-Chip (SOC) configured to support computer vision processing in a camera-based ADAS.

FIG. 1 illustrates a high-level block diagram of an example multiprocessor system-on-a-chip (SOC) 100 configured to support computer vision processing in a camera-based ADAS. The SOC 100 includes dual general-purpose processors (GPP) 102, dual digital signal processors (DSP) 104, a vision processor 106, and a vision preprocessing accelerator (VPAC) 112 coupled via a high-speed interconnect 122. As is explained in more detail in reference to FIG. 2, the VPAC 112 includes several hardware accelerators configured to perform various pre-processing operations on incoming camera images. The vision processor 106 is a vector processor tuned for computer vision processing such as gradient computation, orientation binning, histogram normalization, etc. Such computer vision processing may use the preprocessed output of the VPAC 112. The GPP 102 hosts the operating system and provides overall control of the operation of the SOC 100 including scheduling of the preprocessing tasks performed by the VPAC 112. The DSP 104 provides support for computer vision processing such as object detection and classification.

The SOC 100 further includes a direct memory access (DMA) component 108, a camera capture component 110 coupled to a camera 124, a display management component 114, on-chip random access (RAM) memory 116, e.g., a computer readable medium, and various input/output (I/O) peripherals 120 all coupled to the processors and the VPAC 112 via the interconnect 122. In addition, the SOC 100 includes a safety component 118 that includes safety related functionality to enable compliance with automotive safety requirements. Such functionality may include support for CRC (cyclic redundancy check) of data, clock comparator for drift detection, error signaling, windowed watch-dog timer, and self-testing of the SOC for damage and failures.

Figure 2:
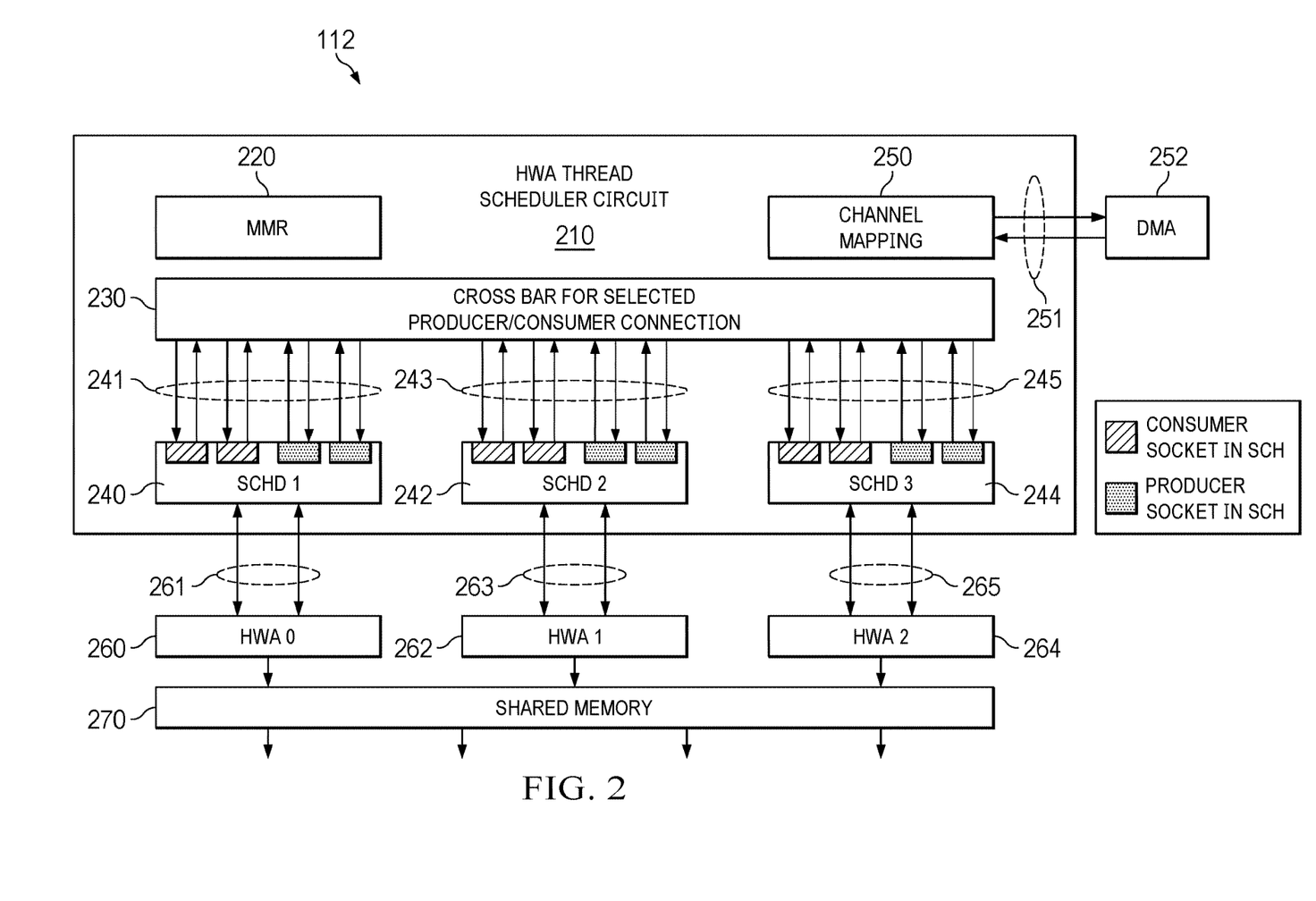
FIG. 2 illustrates a high-level block diagram of an example vision processing accelerator (VPAC) of the SOC of FIG. 1.

FIG. 2 illustrates a high-level block diagram of a processing accelerator of the SOC of FIG. 1. For example, FIG. 2 may represent a high-level block diagram of an example VPAC 112. The VPAC 112 includes three hardware accelerators HWA 0 260, HWA 1, 262, and HWA 2 264 connected to a hardware thread scheduler circuit 210 and to shared memory 270. Three hardware accelerators are shown for simplicity of explanation. One of ordinary skill in the art will understand embodiments having more or fewer accelerators. The hardware accelerators may be general purpose or customized for a particular task and may include, for example, a lens distortion correction accelerator, an image scaling accelerator, a noise filter, and a vision specific image processing accelerator. Blocks of storage area in the shared memory 270 may be designated as buffers for blocks of data being processed by the hardware accelerators HWA 0 260, HWA 1, 262, and HWA 2 264.

The hardware thread scheduler circuit 210 is also connected to one or more channel of the DMA 252. One of ordinary skill in the art will understand embodiments in which the hardware thread scheduler is connected to any number of DMA channels. The DMA channels may be programmed to move blocks of data between the shared memory 270 and external memory, e.g., RAM 116. In some embodiments, RAM 116 comprises Double Data Rate Synchronous Dynamic Random-Access Memory (DDR-SDRAM).

The hardware thread scheduler circuit 210 is configurable to schedule the execution of a single thread of tasks or multiple concurrent threads of tasks by nodes of the VPAC 112. A node is an accelerator and/or proxy to Direct Memory Access (DMA)/external thread management. A thread, which may also be referred to as a pipeline, is a sequence of tasks which have dependencies only in one direction. A task is a particular function performed by a node, and a node performs a single task. A node that technically performs multiple tasks handles those tasks independently from each other, and from a thread management point of view, these tasks are treated as if performed by separate nodes. Nodes may start tasks on any other node. A node may be, for example, a hardware accelerator configured to perform a single task, a portion of a hardware accelerator configured to perform a task, a channel of the DMA 252, or software implementing a task on a processor external to the VPAC 112, e.g., the DSP 104. Further, the execution of a task on a node is managed by a respective hardware task scheduler (such as SCHD 1 240, SCHD 2 242, and SCHD 3 244) in the hardware thread scheduler dedicated to the node/task.

The hardware thread scheduler circuit 210 is configurable to map the hardware accelerators into a variety of different pipelines. In other words, the hardware thread scheduler circuit 210 may configure any one or more of the hardware accelerators into any order within a pipeline, and may configure two or more of the hardware accelerators to run in parallel on the same data.

Examples of hardware accelerators configured to perform a single task are a noise filtering accelerator and a lens distortion correction accelerator. An example of a hardware accelerator in which a portion may be configured to perform a task is an image scaling accelerator configurable to perform image scaling on two or more images requiring different configurations concurrently. That is, the image scaling accelerator may include multiple scalers that may be configured to perform multiple concurrent scaling tasks. One example of such an image scaler is described in U.S. patent application Ser. No. 15/143,491 filed Apr. 29, 2016, which is incorporated by reference herein in its entirety.

The VPAC 112 includes multiple nodes: the single task hardware accelerators 260, 262, 264, and the one or more DMA channels 251. The hardware thread scheduler circuit 210 includes a hardware task scheduler SCHD 1 240, SCHD 2 242, and SCHD 3 244 for each hardware accelerator node in the VPAC 112, and at least one DMA hardware task scheduler (not illustrated) within Channel Mapper 250 for each channel of the DMA 252 used by the VPAC 112. The task schedulers SCHD 1 240, SCHD 2 242, and SCHD 3 244, and the at least one DMA hardware task scheduler are connected to a scheduler crossbar 230 that may be configured by various memory mapped registers in the memory mapped registers (MMR) 220 to chain task schedulers to create threads. In other words, the scheduler crossbar 230 provides for communication of control information between task schedulers assigned to a thread. The scheduler crossbar 230 may be a full crossbar in which any task scheduler can be chained with any other task scheduler or a partial crossbar with more limited chaining capability.

In general, the thread scheduling of the hardware thread scheduler circuit 210 is a consumer/producer model. That is, a thread is a set of tasks with consumer/producer dependencies. Each consumer/producer dependency is managed using a producer socket that provides an indication when data output by a producer is available and a consumer socket that receives the indication that the data is available. A node whose respective scheduler has an active consumer socket is called a consumer node. A node whose respective scheduler has an active producer socket is called a producer node. Each node is able to activate its successor by utilizing its scheduler's producer socket to notify the successor's scheduler's consumer socket.

A task/node managed by a task scheduler may be a consumer task that consumes data from one or more producer tasks, a producer task that produces data for one or more consumer tasks, or both a consumer task and a producer task. A task scheduler may include one or more active producer and/or consumer sockets depending on the type of task of the associated node. For example, if a task scheduler is connected to a node that performs a consumer task that consumes data from one producer task, then the task scheduler may have a single active consumer socket. If the consumer task consumes data from more than one producer task, then the task scheduler may have one active consumer socket for each producer task.

If a task scheduler is connected a node that performs a producer task that produces data for a single consumer task, then the task scheduler may have a single active producer socket. If the producer task produces data for more than one consumer task, then the task scheduler may have one producer socket for each consumer task. If a task scheduler is connected to a node that performs a consumer/producer task, then the task scheduler may have a consumer socket for each producer task producing data for the consumer/producer task and a producer socket for each consumer task consuming data from the consumer/producer task.

In the VPAC 112, the task schedulers 240, 242, and 244 are depicted as having two consumer sockets and two producer sockets for simplicity. One of ordinary skill in the art will understand that the number of producer and consumer sockets in a task scheduler may vary depending upon the consumption and production properties of the task/node connected to the task scheduler. Each node corresponding to a channel of the DMA either executes a task that consumes data, i.e., is a consumer channel programmed to transfer data from shared memory 270 to external memory, or produces data, i.e., is a producer channel programmed to transfer data from external memory to shared memory 270. The DMA task schedulers are connected to consumer channels and each includes a single consumer socket. The DMA task schedulers are connected to producer channels and each includes a single producer socket.

Each socket of the task schedulers 240, 242, and 244 is connected to the scheduler crossbar 230 by two signals 241, 243, and 245, a pending signal indicating availability of consumable data, and a decrement signal indicating that a block of produced data has been consumed. A pending signal may be referred to as a "pend" signal herein and a decrement signal may be referred to as a "dec" signal herein. A task scheduler sends a pend signal via a producer socket to a consumer socket connected to the producer socket when data is available and receives a dec signal via the producer socket from the connected consumer socket when the produced data has been consumed. A task scheduler sends a dec signal via a consumer socket to a producer socket connected to the consumer socket when the produced data has been consumed and receives a pend signal in the consumer socket from a connected producer socket when data is available for consumption.

The connection of pend and dec signals between producer and consumer sockets of task schedulers to form threads is controlled by the scheduler crossbar 230. Scheduling software executing on the GPP 102 may configure a thread of tasks to be performed on the VPAC 112 by setting control signal values of multiplexers in the scheduler crossbar 230 to "connect" the pend and dec signals of the task schedulers for the desired tasks.

Figure 5:
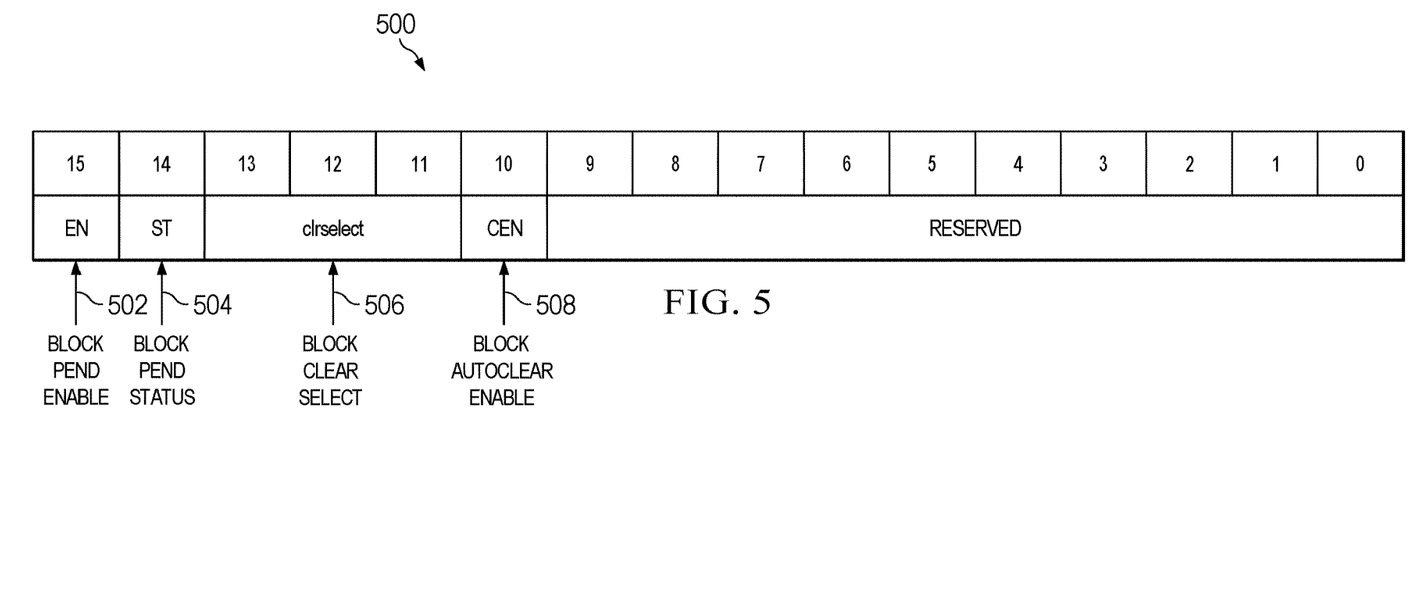
FIG. 5 illustrates an example embodiment of Memory Mapped Register (MMR) configured to define a pending blocking feature.

In some embodiments, the scheduler crossbar 230 includes a multiplexer for the incoming pend signal of each consumer socket and a multiplexer for the incoming dec signal of each producer socket, as illustrated in FIG. 5 and described in detail below. For example, if the task schedulers 240, 242, and 244 include M consumer sockets and N producer sockets, then the scheduler crossbar 230 includes M+N multiplexers. A multiplexer connected to the incoming dec signal of a producer socket includes a single output connected to the incoming dec signal and M inputs, one for each outgoing dec signal of each consumer socket. A multiplexer connected to the incoming pend signal of a consumer socket includes a single output connected to the incoming pend signal and N inputs, one for each outgoing pend signal of each producer socket. Each of the multiplexers is connected to a corresponding control register in the MMR 220 that can be programmed to select one of the multiplexer inputs as the output.

Each of the task schedulers 240, 242, and 244 is connected to a respective node via various signals 261, 263, and 265. The signals may be, for example, a node initialization signal, an initialization complete acknowledgement signal, a task start signal, a task completion signal, and an end of processing signal. Table 1 provides more detail about each of these signals in one example embodiment. In the table, the column labeled "Dir" indicates the direction of the signal with respect to the task scheduler. The end of processing signal is needed as a task may be executed multiple times to process incoming data, e.g., a task may be executed multiple times to process different subsets of a block of video data. The node/task is aware of when all the data has been processed and uses the eop signal to indicate that all the data has been processed and there is no need to execute the task again. Each time the task scheduler receives the task completion signal, the task scheduler will start the task again unless the end of processing signal is received.

TABLE 1

| Signal Name | Dir | Description |
| --- | --- | --- |
| init | out | Initialize node/task |
| init_done | in | Node/task initialization is complete |
| tstart | out | Start task execution |
| tdone | in | Task execution is complete |
| tdone_mask | in | For each tdone, mask indicates validity of output data. When '0' indicates corresponding output buffer was not generated; when '1' indicates valid output buffer is generated. |
| eop | in | Node processing is complete |

Figure 4:
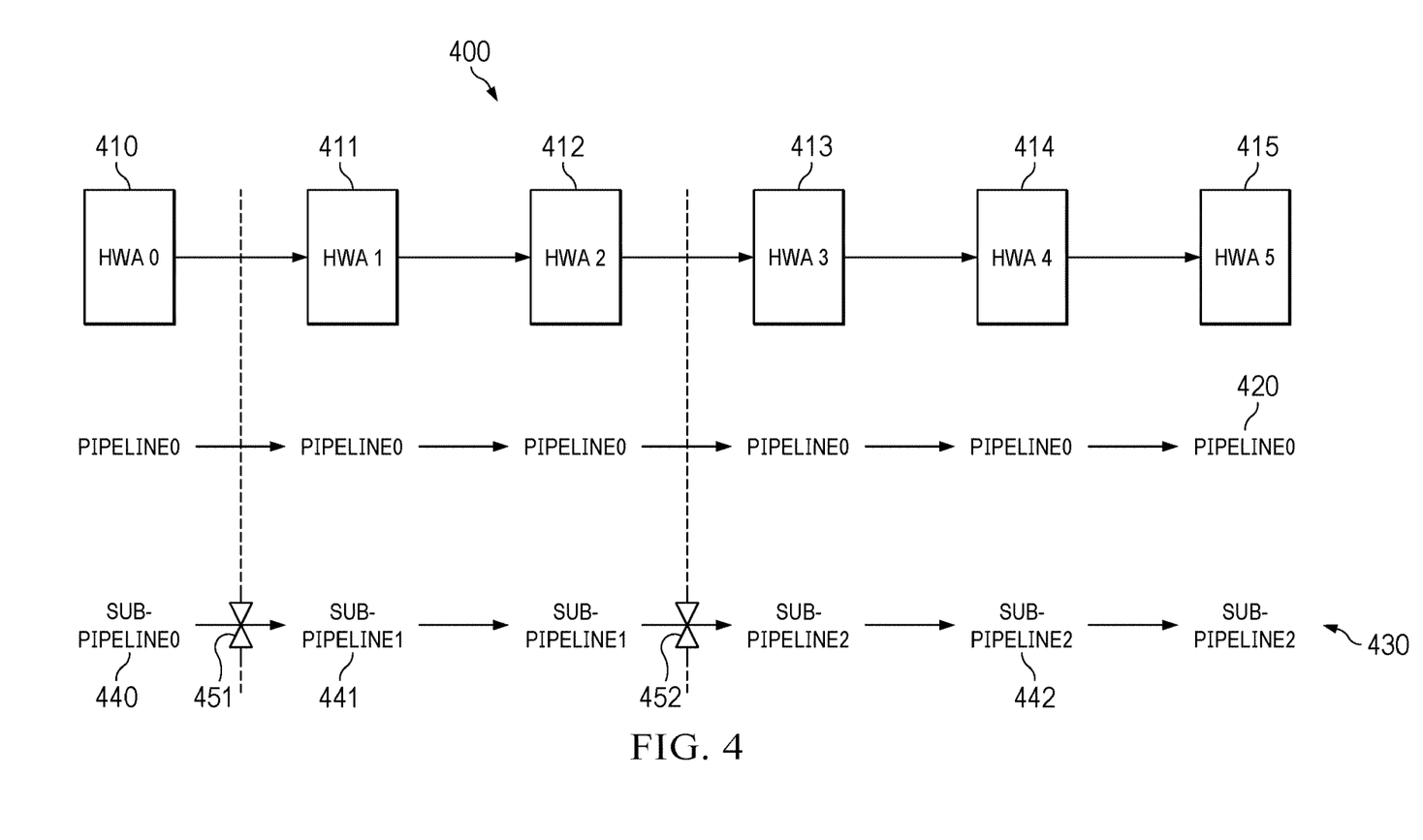
FIG. 4 illustrates an example embodiment of a pipeline including a plurality of hardware accelerators.

The MMR 220 is configured to store various control and configuration parameters for the hardware thread scheduler circuit 210. The parameters include parameters for configuring and controlling threads and parameters for configuring and controlling the task schedulers 240, 242, and 244. In some embodiments, the MMR 220 includes a thread control register for each of a maximum number of threads that may be executed concurrently on the VPAC 112. Each thread control register corresponds to a particular thread number, e.g., 0, 1, . . . n-1 where n is the maximum number of threads. A thread control register includes an enable/disable bit that may be used to activate or deactivate the corresponding thread. Further, the MMR 220 include a task scheduler control register for each task scheduler 240, 242, and 244. In an example embodiment, the MMR 220 further include a block pending register coupled with the producer socket of each hardware accelerator 260, 262, and 264. These block pending registers are illustrated in FIG. 4 and described in detail below. A task scheduler control register includes an enable/disable bit that may be used to activate or deactivate the corresponding task scheduler and a field identifying the thread number to which the task scheduler is assigned.

In such embodiments, the MMR 220 also includes a consumer control register for each consumer socket and a producer control register for each producer socket. A consumer control register includes an enable/disable bit that may be used to activate or deactivate the corresponding consumer socket and the producer select value for the multiplexor connected to the consumer socket. A consumer control register for a consumer socket in a proxy task scheduler also includes a "pend" bit that may be set by the external task to indicate when data is available for consumption.

A producer control register includes an enable/disable bit that may be used to activate or deactivate the corresponding producer socket and the consumer select value for the multiplexor connected to the producer socket. A producer control register for a producer socket in a proxy task scheduler also includes a "dec" bit that may be set by the external task to indicate that a block of data has been consumed.

The MMR 220 also includes a task count register for each proxy task scheduler and producer DMA task scheduler. The task count register is used to specify how many times the task controlled by the task scheduler is to be executed. This information is used by the task scheduler to determine when task processing is complete and eop can be signaled, e.g., the task scheduler may count the number of task starts/completions and signal eop when the task has been completed the number of times specified in the task count register.

Figure 3:
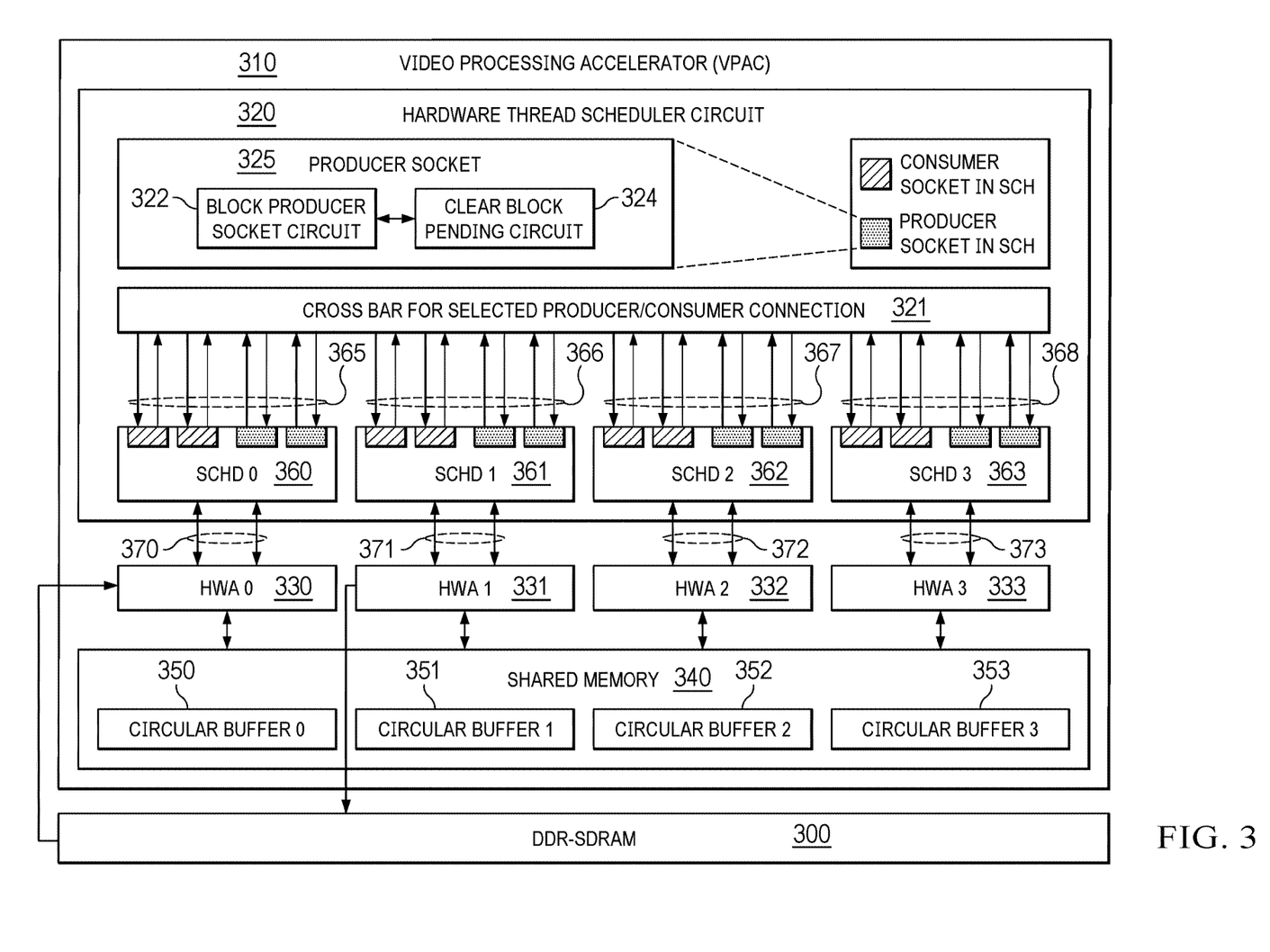
FIG. 3 illustrates a high-level block diagram of an example vision processing accelerator (VPAC) of the SOC of FIG. 1 along with a Double Data Rate Synchronous Dynamic Random-Access Memory (DDR-SDRAM).

The MMR 220 also includes a producer buffer control register and a producer count register for each producer socket. A producer buffer control register includes a buffer depth field specifying the maximum number of blocks of data a producer can have pending for consumption and a producer count register includes a count field that holds the count of how many blocks of data a producer currently has pending for consumption. The value of the buffer depth field depends on the amount of shared memory assigned for storing the produced data blocks and the size of the data blocks. The combination of the maximum buffer depth and the count may be used to prevent buffer overflow and underflow as production and consumption of data may be asynchronous. These buffers are illustrated in FIG. 3 and described in detail below.

Scheduling software executing on the GPP 102 may configure a thread to be executed on the VPAC 310 by writing appropriate values in the registers of the task schedulers to be included in the thread. In particular, the scheduling software may write appropriate producer select values and consumer select values for the sockets of the task schedulers of the tasks to be included in the thread to synchronize the tasks and enable the sockets. The scheduling software may also appropriately set the enable/disable bit in the task scheduler control register of each task scheduler in the thread to enable each task scheduler. The scheduling software may also select a thread number for the thread and write that thread number in the task scheduler register of each task scheduler in the thread. Once a thread is configured, the scheduling software may initiate execution of the thread by appropriately setting the enable/disable bit in the corresponding thread control register to activate the thread.

The scheduling software may configure two or more threads that execute concurrently on the VPAC 310 where each thread is configured as previously described. Each concurrent thread may be configured to include a separate non-overlapping subset of the task schedulers 240, 242, and 244. For example, one concurrent thread may include the task scheduler 240 and another concurrent thread may include the task schedulers 242 and 244. Further, the scheduling software may configure a thread on a subset of the task schedulers and start execution of that thread. While the previously configured thread is executing, the scheduler may configure a second thread on another subset of the task schedulers and start execution of the second thread. The scheduling software may also configure two or more threads and initiate concurrent execution of the configured threads once all are configured.

In an embodiment, each task is activated remotely, and each task always indicates an end-of-task when done. Indications are sent to the schedulers of relevant nodes to notify task completion, which is used for initialization of the next task. Inter-scheduler communication is provided by a partial crossbar. Nodes are capable of direct setup from software through a configuration port, and one or more conditions need to be met for a task to be triggered or initiated. Notifications to initiate a task can only occur after all data for that task is ready to be used in the shared memory 270.

The is the responsibility of the predecessor node. A task is initiated at the completion of related tasks by the predecessor node(s) and eventually at the completion of some following node if they share resources.

In video processing, re-initialization is performed at a frame or slice level, and the conditions to initiate a task remain static during an operation. Dedicated activation events for DMA destination nodes are not broadcast. Activation events for HWA destination nodes are broadcast. Several activation events pending signals are accumulated at a source node itself prior to indicating an accumulated pending event signal to the HWA node for task scheduling. Consumer nodes acknowledge consumption of data with a decrement event signal at the end of the task. Producer nodes can use this signal to decrement their produced data count.

FIG. 3 illustrates a high-level block diagram of an example processing device such as the vision processing accelerator (VPAC) of the SOC of FIG. 1 along with a Double Data Rate Synchronous Dynamic Random-Access Memory (DDR-SDRAM).

This example embodiment is similar to the embodiment illustrated in FIG. 2 and described above, with the addition of a DDR-SDRAM 300 coupled with the VPAC 310. In this embodiment, the VPAC 310 includes a hardware thread scheduler circuit 320, four hardware accelerators HWA 0 330, HWA 1 331, HWA 2 332, and HWA 3 333, and shared memory 340.

The hardware thread scheduler circuit 320 includes four schedulers SCHD 0 360, SCHD 1 361, SCHD 2 362, and SCHD 3 363, substantially similar to SCHD 1 240, SCHD 2 242, and SCHD 3 244, with one scheduler coupled to each of the four hardware accelerators: HWA 0 330, HWA 1 331, HWA 2 332, and HWA 3 333. Each scheduler includes two consumer sockets and two producer sockets 325 configured to send and receive pending and decrement signals within the hardware thread scheduler circuit 320. While this example embodiment includes two consumer sockets and two producer sockets within each scheduler, other embodiments can include any number of consumer and producer sockets. The hardware thread scheduler circuit 320 includes a scheduler crossbar 321 coupled to the schedulers 360-363 and an MMR 220, each substantially similar to those described above.

Each producer socket 325 also includes a blocking producer socket circuit 322 and a clear block pending circuit 324. The blocking producer socket circuit 322 provides each task scheduler with the ability to block pending signals for its respective hardware accelerator until the hardware accelerator has completed its task and a next hardware accelerator has completed reading or copying any output data from the shared buffer. In some examples, the blocking producer socket circuit 322 prevents a signal from propagating from a producer socket of a first scheduler to a consumer socket of a second scheduler until the clear block pending circuit 324 indicates that a dependency, such as the completion of a HWA elsewhere in the pipeline, has been satisfied. The blocking producer socket circuit 322 and clear block pending circuit 324 provide the ability to create more complicated dependences than producer/consumer sockets alone and may be used to divide the hardware accelerators into one or more sub-pipelines as illustrated in FIG. 4 and described below.

In an example, where a set of data (e.g., a frame or slice) is processed by HWA 0 330, then HWA 1 331, then HWA 2 332, and then HWA 3 333, the blocking producer socket circuit 322 may be utilized to define HWA 1 331 and HWA 2 332 as a sub-pipeline such that processing of a first frame using the sub-pipeline must complete and the first frame must exit the sub-pipeline before processing a second frame using the sub-pipeline. In this example, the blocking producer socket circuit 322 prevents a consumer socket of scheduler SCHD 1 361 associated with HWA 1 331, the first node in the sub-pipeline, from receiving a signal from a producer socket of scheduler SCHD 0 360 associated with a previous node (HWA 0 330) until a producer socket of scheduler SCHD 2 362 has indicated that the last node in the sub-pipeline (HWA 2 332) has completed processing the first frame. In this way, the second frame will wait after processing by HWA 0 330 until the first frame clears the sub-pipeline of HWA 1 331 and HWA 2 332.

This blocking is controlled through MMR registers such as illustrated in FIG. 5 and described below. Once the first frame has exited the sub-pipeline, the clear block pending circuit 324 clears the blocked pending signal for its respective hardware accelerator thereby allowing the second frame to enter the sub-pipeline.

In some embodiments, spare task schedulers are included in hardware thread scheduler circuit 320 to provide data control management between the various hardware accelerators 330-333.

In this example embodiment, each hardware accelerator is coupled with a circular buffer in shared memory 340. Here HWA 0 330 is coupled with circular buffer 0 350, HWA 1 331 is coupled with circular buffer 1 351, HWA 2 332 is coupled with circular buffer 2 352, and HWA 3 333 is coupled with circular buffer 3 353. In other embodiments, each hardware accelerator can be coupled with any number of circular buffers, and each circular buffer can be coupled with any number of hardware accelerators.

These circular buffers 350-353 are configured to store data for input to the hardware accelerators and to store data output from the hardware accelerators.

FIG. 4 illustrates an example embodiment of a pipeline 400 including a plurality of hardware accelerators 410-415. In this example embodiment, pipeline 400 includes six hardware accelerators HWA 0 410, HWA 1 411, HWA 2 412, HWA 3 413, HWA 4 414, and HWA 5 415. The six hardware accelerators HWA 0-5 410-415 are connected as a pipeline.

In some current embodiments, the hardware accelerators are connected as a single Pipeline0 420. As discussed above, when processing multiple video frames, that often require re-configuration and re-initiation of one or more hardware accelerator between frames, the entirety of Pipeline0 must be cleared before HWA 0 410 is able to start processing a new frame. This overhead is noticeable in many video applications.

In contrast, in an example embodiment of a pipeline 430 including three sub-pipelines; Sub-pipeline0 440, Sub-pipeline1 441, and Sub-pipeline2 442, three different frames are able to be concurrently processed in each of the sub-pipelines. For example, Sub-pipeline0 440 may begin by processing frame 0 and passing its results to Sub-pipeline1 441. Sub-pipeline1 441 then begins processing frame 0 and Sub-pipeline0 440 may continue processing frame 0. As soon as Sub-pipeline0 440 completes processing of frame 0 and Sub-pipeline1 441 receives all the frame 0 data from Sub-pipeline0 440, Sub-pipeline0 440 may begin processing frame 1. As soon as Sub-pipeline0 440 begins processing frame 1, it activates the block pending signal between Sub-pipeline0 440 and Sub-pipeline1 441. This is illustrated as blocking circuit 451. Blocking circuit 451 can take any of a wide variety of hardware and/or software configurations that are configured to block dataflow between sub-pipelines.

At this point in time, Sub-pipeline1 441 is processing frame 0 while Sub-pipeline0 440 is processing frame 1.

Once Sub-pipeline1 441 completes processing of frame 0 and Sub-pipeline2 442 receives all the frame 0 data from Sub-pipeline1 441, Sub-pipeline1 441 may begin processing frame 1. In order to do so, it clears the block pending signal (using any of a variety of hardware or software methods) at gate 451 and begins receiving frame 1 data from Sub-pipeline0 440. It also activates the block pending signal between Sub-pipeline1 441 and Sub-pipeline2 442. This is illustrated as blocking circuit 452. Blocking circuit 452 can take any of a wide variety of hardware and/or software configurations that are configured to block dataflow between sub-pipelines. At this point in time, Sub-pipeline2 442 is processing frame 0 while Sub-pipeline1 441 and Sub-pipeline0 440 are processing frame 1.

By dividing the overall pipeline into three sub-pipelines, it is possible to simultaneously process three different frames within the pipeline without any need to flush the complete pipeline between frames.

FIG. 5 illustrates an example embodiment of Memory Mapped Register (MMR) 500 configured to define a pending blocking feature. In this embodiment, an MMR such as illustrated in FIG. 5 is added for each producer socket of the scheduler of each hardware accelerator as well as spare schedulers. Physically, these registers may reside anywhere within the overall system and are accessed using respective memory addresses by the thread scheduler and the hardware accelerators.

In this example, six bits of a 16-bit MMR (other embodiments can use other sizes of MMR) are used to implement a producer socket blocking feature while the remaining ten bits of the MMR are reserved or reused for other purposes, including other producer socket configurations. Bit 15 block_pend_en 502 enables the block pending signal. When block_pend_en 502 is enabled the pending signal is blocked at the producer socket when the associated hardware accelerator reaches its end of process (eop).

Bit 14 block_pend_status 504 stores the status of the block pending signal at the producer socket. Bits 11-13 block_pend_clrselect 506 are used to select between eight hts events which clear the pending signal. Bit 10 block_pend_autocle_en 508 enables clearing the block pending status at the producer socket by an hts event versus a software event when auto clear is not enabled.

Figure 6:
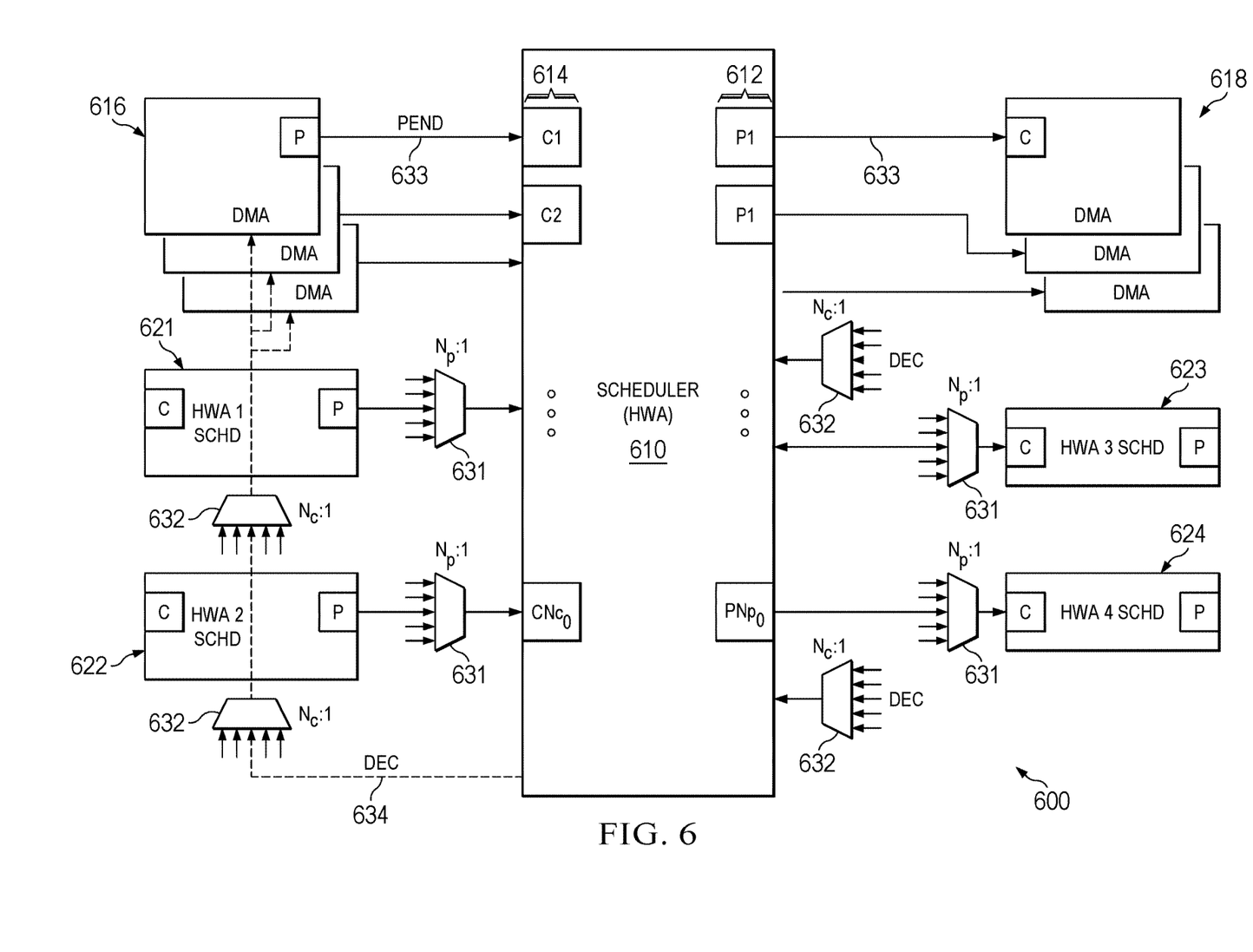
FIG. 6 illustrates an example connection diagram for various circuits within an example vision processing accelerator (VPAC) of the SOC of FIG. 1.

FIG. 6 illustrates an example connection diagram for various circuits within an example vision processing accelerator (VPAC) of the SOC of FIG. 1.

In this example embodiment scheduler circuit 600 is illustrated including a plurality of producer sockets 612 and consumer sockets 614. A plurality of DMA nodes having producer sockets 616 and a plurality of DMA nodes having consumer sockets 618 are coupled with hardware thread scheduler 610. Four task schedulers corresponding to four hardware accelerators are also illustrated (HWA1 SCHD 621, HWA2 SCHD 622, HWA3 SCHD 623, and HWA4 SCHD 624). HWA1 SCHD 621 and HWA2 SCHD 622 include producer sockets providing pending signals 633 to hardware thread scheduler 610. HWA3 SCHD 623 and HWA4 SCHD 624 include consumer sockets receiving pending signals 633 from hardware thread scheduler 610.

As described above with respect to FIG. 2, multiplexors 631 and 632 are included to multiplex pluralities of pending signals and decrement signals. Multiplexors 631 are configured to multiplex pending signals, and multiplexors 632 are configured to multiplex decrement signals.

In operation, hardware thread scheduler 610 assigns a maximum buffer allocable to producer sockets. Except for the head of the pipeline, each node receives consumable data and produces data to be consumed by a downstream consumer. The head of the pipeline DMA producer node fetches data from DDR and passes it on to a consumer socket. When buffer space is available for all producer sockets of a task scheduler, the task of the HWA or DMA can start depending on its consumer socket status, if enabled.

Each HWA, depending on multiple produced data, waits for all enabled consumer sockets to be available (e.g., to have received their respective pending signals 653) to start its own producing task. In a multi-consumer embodiment, each producer, which produces the data for several consumers, sends one pending signal for each consumer. Hardware thread scheduler 610 includes all resources (multiple producer sockets) to emulate single producer to multi-consumer scenarios. Although produced data is the same for each consumer, it is managed as if multiple data is produced.

Similarly, in a multi-producer scenario, every consumer, which consumes data from several producers, sends back one decrement signal for each producer. For flow control, it must be ensured that producers do not overwrite the data that has not yet been consumed and consumers do not read empty buffers. Consumer sockets use pending signals form connected producer sockets to manage flow control.

Figure 7:
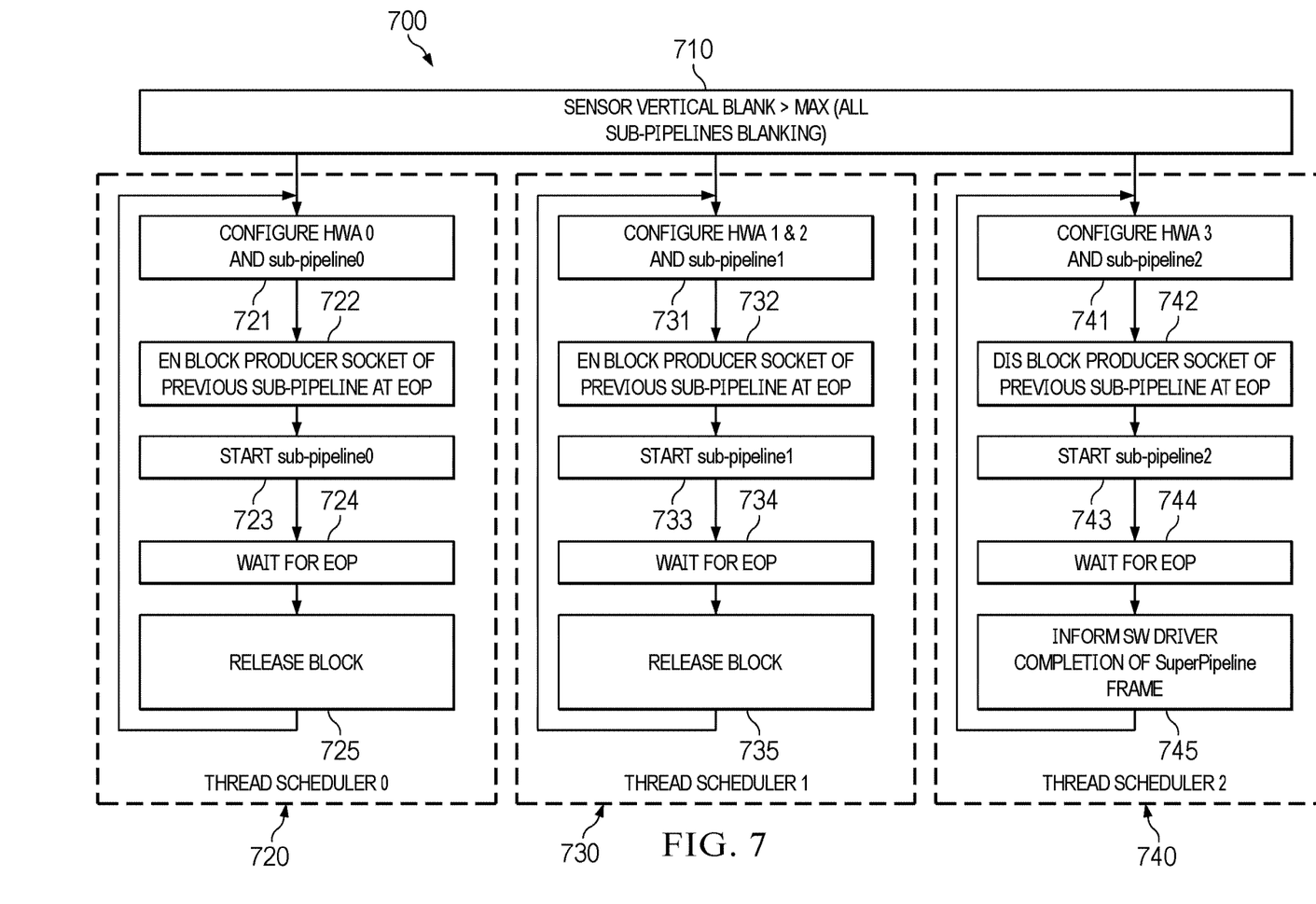
FIG. 7 illustrates a flow chart of an example embodiment of a method for executing concurrent threads on a hardware thread scheduler.

FIG. 7 illustrates a flow chart 700 of an example embodiment of a method for executing concurrent sub-pipeline threads within a hardware thread scheduler circuit 320. In this example method, hardware thread scheduler 320 includes three thread schedulers: thread scheduler 0 720, thread scheduler 1 730, and thread scheduler 2 740 concurrently schedule threads for each of their corresponding sub-pipelines within a vision processing accelerator (VPAC). Each thread scheduler can comprise any number of hardware task schedulers as needed for each sub-pipeline.

At initialization, when there are no frames being processed (e.g., all sub-pipelines are blanking) (operation 710) hardware thread scheduler circuit 320 causes the schedulers SCHD 0 360, SCHD 1 361, SCHD 2 362, and SCHD 3 363 to initialize their respective HWAs (e.g., HWA 0 330, HWA 1 331, HWA 2 332, and HWA 3 333).

In an example, HWA 0 330 is a vision image sub-system (VISS) hardware accelerator and is part of a first sub-pipeline, Sub-pipeline 0 440. HWA 1 331 and HWA 2 332 are components of a lens distortion correction accelerator and are part of a second sub-pipeline, Sub-pipeline1 441. HWA 3 333 is a multi-scalar engine (MSC) hardware accelerator and is part of a third sub-pipeline, Sub-pipeline2 442.

In this example embodiment, task scheduler SCHD 0 360 triggers the configuration of HWA 0 410 and Sub-pipeline0 440, (operation 721). The blocking producer socket circuit 322 enables a block pending signal for the producer socket of the scheduler associated with whichever HWA is last (end of processing (EOP) in a preceding sub-pipeline (if there is a preceding sub-pipeline) (operation 722). This prevents the output of the producer socket of the scheduler for the preceding sub-pipeline from reaching the scheduler for the current sub-pipeline (e.g., Sub-pipeline0 440), thereby preventing a subsequent frame from entering the current sub-pipeline. Scheduler SCHD 0 360 then activates HWA 0 410 thereby starting Sub-pipeline0 440, (operation 723).

When whichever HWA is last in the current sub-pipeline completes (in this example, HWA 0 410 in Sub-pipeline0 440) and signals end of pipeline (operation 724), if block pending is enabled, the clear block pending circuit 324 waits for either software intervention or selected hardware events from the next HWA, then directs the blocking producer socket circuit 322 to release the block and allow a complete signal to propagate from the producer socket of the last scheduler for the preceding sub-pipeline to reach the first scheduler for the current sub-pipeline (e.g., scheduler SCHD 0 360) (operation 725). The clear block pending circuit 324 may be configured to detect the completion of the last HWA in the current sub-pipeline, or a program executing on another processing resource may detect the completion of the last HWA and provide a signal indicating the completion to the clear block pending circuit 324. Operations 721-725 then repeat for the next frame.

In this example embodiment, task schedulers SCHD 1 361 and SCHD 2 362 trigger the configuration of HWA 1 331, HWA 2 332, and Sub-pipeline1 441, (operation 731). The blocking producer socket circuit 322 enables a block pending signal for the producer socket of scheduler SCHD 0 360 associated with HWA 0 330, which is last (end of processing (EOP) in the preceding Sub-pipeline0 440 (operation 732). This prevents the output of the producer socket of the scheduler SCHD 0 360 for Sub-pipeline0 440 from reaching the scheduler for Sub-pipeline1 441, thereby preventing a subsequent frame from entering Sub-pipeline1 441. Schedulers SCHD 1 361 and SCHD 2 362 then activate HWA 1 331 and HWA 2 332, thereby starting Sub-pipeline1 441, (operation 733).

When HWA 2 332, which is last in Sub-pipeline1 441, completes its processing and signals end of pipeline (operation 734), if block pending is enabled, the clear block pending circuit 324 waits for either software intervention or selected hardware events from the next HWA, then directs the blocking producer socket circuit 322 to release the block and allow a complete signal to propagate from the producer socket of SCHD 0 360 for sub-pipeline 0 to reach SCHD 1 361 for Sub-pipeline1 441 (operation 735). The clear block pending circuit 324 may be configured to detect the completion of the last HWA in the current sub-pipeline, or a program executing on another processing resource may detect the completion of the last HWA and provide a signal indicating the completion to the clear block pending circuit 324. Operations 731-735 then repeat for the next frame.

In this example embodiment, task scheduler SCHD 3 363 triggers the configuration of HWA 3 333 and Sub-pipeline2 442, (operation 741). The blocking producer socket circuit 322 enables a block pending signal for the producer socket of scheduler SCHD 2 362 associated with HWA 2 332, which is last (end of processing (EOP) in the preceding Sub-pipeline1 441 (operation 742). This prevents the output of the producer socket of the scheduler SCHD 2 362 for Sub-pipeline1 441 from reaching the scheduler for Sub-pipeline2 442, thereby preventing a subsequent frame from entering Sub-pipeline2 442. Scheduler SCHD 3 363 then activates HWA 3 333, thereby starting Sub-pipeline2 442, (operation 743).

When HWA 3 333, which is last in Sub-pipeline2 442, completes its processing and signals end of pipeline (operation 744), task scheduler 2 740 informs a software driver of the completion of a pipeline frame (operation 745). The clear block pending circuit 324 may be configured to detect the completion of the last HWA in the current sub-pipeline, or a program executing on another processing resource may detect the completion of the last HWA and provide a signal indicating the completion to the clear block pending circuit 324. Operations 741-745 then repeat for the next frame.

Figure 8:
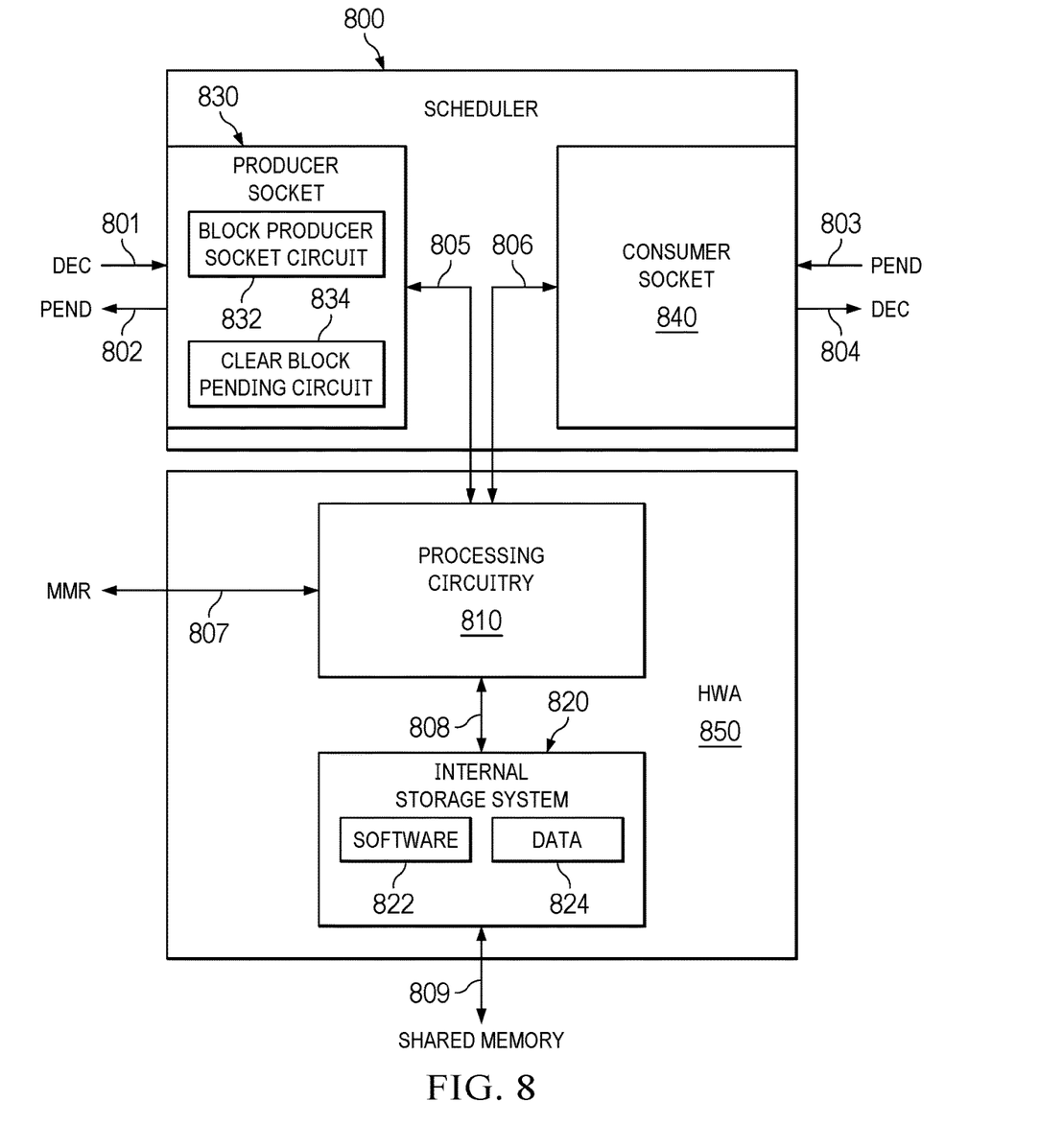
FIG. 8 illustrates a block diagram of an example embodiment of a scheduler and a hardware accelerator within a vision processing accelerator (VPAC).

FIG. 8 illustrates a block diagram of an example embodiment of a scheduler 800 and hardware accelerator 850 within a vision processing accelerator (VPAC) 112.

As discussed above, scheduler 800 and hardware accelerator 850 may take on any of a wide variety of configurations. Here, a simplified example configuration is provided for any of the schedulers SCHD 0-3 360-363 and hardware accelerators HWA 0-3 330-333 of FIG. 3.

In this example embodiment, scheduler 800 includes producer socket 830, and consumer socket 840, while HWA 850 includes processing circuitry 810 and internal storage system 820. Producer socket 830 is coupled with processing circuitry 810 through link 805, consumer socket 840 is coupled with processing circuitry 810 through link 806, and processing circuitry 810 is coupled with internal storage system through link 808. Processing circuitry 810 is also coupled with at least one block pending MMR (such as illustrated in FIG. 5) through link 807. Internal storage system 820 is also coupled with shared memory through link 809.

Producer socket 830 is configured to receive a decrement signal 801 from a consumer socket and to provide a pending signal 802 to a consumer socket. Producer socket 830 includes block producer socket circuit 832 and clear block pending circuit 834 configured to operate as described above. Consumer socket 840 is configured to receive a pending signal 803 from a producer socket and to provide a decrement signal 804 to a producer socket.

Processing circuitry 810 comprises electronic circuitry configured to direct hardware accelerator 850 to act as a hardware accelerator 330-333 within a vision processing accelerator 112 as described above. Processing circuitry 810 may comprise microprocessors and other circuitry that retrieves and executes software 822. Examples of processing circuitry 810 include general purpose central processing units, application specific processors, and logic devices, as well as any other type of processing device, combinations, or variations thereof. Processing circuitry 810 can be implemented within a single processing device but can also be distributed across multiple processing devices or sub-systems that cooperate in executing program instructions.

Internal storage system 820 can comprise any non-transitory computer readable storage media capable of storing software 822 that is executable by processing circuitry 810. Internal storage system 820 can also include various data structures 824 which comprise one or more registers, databases, tables, lists, or other data structures. Storage system 820 can include volatile and nonvolatile, removable and non-removable media implemented in any method or technology for storage of information, such as computer readable instructions, data structures, program circuits, or other data.

Storage system 820 can be implemented as a single storage device but can also be implemented across multiple storage devices or sub-systems co-located or distributed relative to each other. Storage system 820 can comprise additional elements, such as a controller, capable of communicating with processing circuitry 810. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 822 can be implemented in program instructions and among other functions can, when executed by hardware accelerator 850 in general, or processing circuitry 810 in particular, direct hardware accelerator 850, or processing circuitry 810, to operate as described herein to process video data. Software 822 can include additional processes, programs, or components, such as operating system software, database software, or application software. Software 822 can also comprise firmware or some other form of machine-readable processing instructions executable by elements of processing circuitry 810.

In general, software 822 can, when loaded into processing circuitry 810 and executed, transform processing circuitry 810 overall from a general-purpose computing system into a special-purpose computing system customized to operate as described herein for a hardware accelerator 850 configured to process video data, among other operations. Encoding software 822 on internal storage system 820 can transform the physical structure of internal storage system 820. The specific transformation of the physical structure can depend on various factors in different implementations of this description. Examples of such factors can include, but are not limited to the technology used to implement the storage media of internal storage system 820 and whether the computer-storage media are characterized as primary or secondary storage.

For example, if the computer-storage media are implemented as semiconductor-based memory, software 822 can transform the physical state of the semiconductor memory when the program is encoded therein. For example, software 822 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Figure 9:
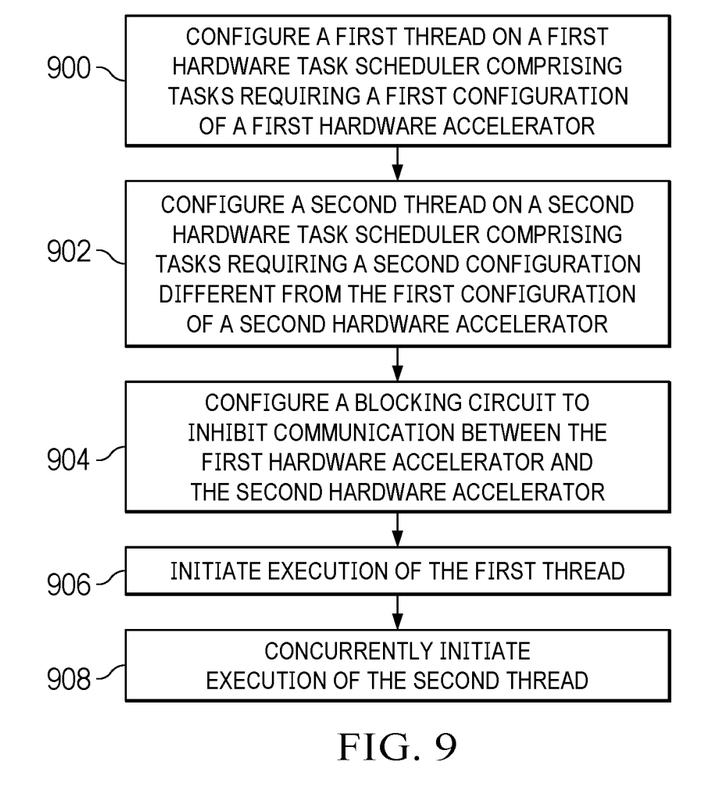
FIG. 9 illustrates a flow chart of an example embodiment of a method for executing concurrent threads on a hardware thread scheduler.

FIG. 9 illustrates a flow chart of an example embodiment of a method for executing concurrent threads on a hardware thread scheduler circuit 210.

In this example method, hardware thread scheduler circuit 210 configures a first thread on a first hardware task scheduler comprising tasks requiring a first configuration of a first hardware accelerator, (operation 900). Hardware thread scheduler circuit 210 configures a second thread on a second hardware task scheduler comprising tasks requiring a second configuration different from the first configuration of a second hardware accelerator, (operation 902).

The scheduler circuit 210 includes a blocking circuit 451 coupled to the plurality of hardware task schedulers and configured to inhibit communication between the first hardware accelerator and the second hardware accelerator, (operation 904). Hardware thread scheduler circuit 210 initiates execution of the first thread, (operation 906), and concurrently initiates execution of the second thread, (operation 908).

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. A data processing device comprising:
first, second, and third hardware accelerator sets, wherein each of the first, second, and third hardware accelerator sets include one or more hardware accelerators; and
a scheduler circuit coupled to the first, second, and third hardware accelerator sets, wherein:
the scheduler circuit includes a first hardware task scheduler circuit coupled to the first hardware accelerator set, a second hardware task scheduler circuit coupled to the second hardware accelerator set, and a third hardware task scheduler circuit coupled to the third hardware accelerator set;
the first hardware task scheduler circuit includes:
a first output circuit configured to provide a first signal to an input circuit of the second hardware task scheduler circuit, wherein the first signal indicates that a first set of data produced by the first hardware accelerator set is available for the second hardware accelerator set; and
a first blocking circuit configured to inhibit communication of the first signal when the first set of data is available based on a status of the second hardware accelerator set; and
the second hardware task scheduler circuit includes;
a second output circuit configured to provide a second signal to an input circuit of a third hardware task scheduler circuit, wherein the second signal indicates that a second set of data produced by the second hardware accelerator set using the first set of data is available for the third hardware accelerator set; and
a second blocking circuit configured to inhibit communication of the second signal when the second set of data is available based on a status of the third hardware accelerator set.

2. The data processing device of claim 1, wherein the first hardware task scheduler circuit further includes a clear block pending circuit configured to cause the first blocking circuit to stop inhibiting communication of the first signal based at least in part on completion of a corresponding task by the second hardware accelerator set.

3. The data processing device of claim 1, wherein:
the first signal is a first pending signal;
the first hardware task scheduler circuit includes an input circuit configured to receive a second pending signal; and
the first hardware task scheduler circuit is configured to cause the first hardware accelerator set to start execution of a corresponding task based on the second pending signal.

4. The data processing device of claim 1, wherein the data processing device is comprised in a multiprocessor system-on-a-chip.

5. The data processing device of claim 1, wherein one or more of the first, second, or third hardware accelerator sets is a processor and is configured to perform a corresponding task that comprises executing software instructions.

6. The data processing device of claim 1 further comprising a memory mapped register that includes a first field, wherein the first blocking circuit is configured to inhibit communication of the first signal based on a value stored in the first field.

7. The data processing device of claim 6, wherein the memory mapped register includes a second field that indicates whether the first blocking circuit is currently inhibiting communication of the first signal.

8. The data processing device of claim 1 further comprising a memory coupled to the first and second hardware accelerator sets, wherein the first signal indicates that the first set of data is available in the memory.

9. The data processing device of claim 1, wherein the third hardware accelerator set is subsequent to the first and second hardware accelerator sets in a pipeline.

10. The data processing device of claim 1, wherein:
the first hardware task scheduler circuit includes:
a set of inputs each configured to receive a respective signal indicating that a respective set of data is available; and
a set of outputs housed by the first output circuit, each configured to provide a respective signal that indicates that a respective set of data is available;
the second hardware task scheduler circuit includes:
a set of inputs housed by the input circuit of the second hardware task scheduler circuit, each configured to receive a respective signal that indicates that a respective set of data is available; and
a set of outputs housed by the second output circuit, each configured to provide a respective signal indicating that a respective set of data is available; and
the data processing device further comprises a crossbar coupled to the set of inputs and the set of outputs of the first hardware task scheduler circuit and coupled to the set of inputs and the set of outputs of the second hardware task scheduler circuit.

11. A data processing device comprising:
first, second, and third hardware accelerator sets, wherein each of the first, second, and third hardware accelerator sets include one or more hardware accelerators; and
a scheduler circuit comprising a first hardware task scheduler circuit coupled to the first hardware accelerator set, a second hardware task scheduler circuit coupled to the second hardware accelerator set, and a third hardware task scheduler circuit coupled to the third hardware accelerator set, wherein:
the first hardware task scheduler circuit includes:
a first output circuit configured to provide a first signal to an input circuit of the second hardware task scheduler circuit, wherein the first signal indicates that a first set of data produced by the first hardware accelerator set is available; and
a first blocking circuit configured to inhibit communication of the first signal when the first set of data is available based on a status of the second hardware accelerator set; and
the second hardware task scheduler circuit includes:
a second output circuit configured to provide a second signal to an input circuit of a third hardware task scheduler circuit, wherein the second signal indicates that a second set of data produced by the second hardware accelerator set using the first set of data is available for the third hardware accelerator set; and
a second blocking circuit configured to inhibit communication of the second signal when the second set of data is available based on a status of the third hardware accelerator set
wherein the scheduler circuit is configured to concurrently control the one or more hardware accelerators of the first hardware accelerator set to execute one or more first tasks and the one or more hardware accelerators of the second hardware accelerator set to execute one or more second tasks.

12. The data processing device of claim 11, wherein the first hardware task scheduler circuit further includes:
a clear block pending circuit configured to cause the first blocking circuit to stop inhibiting communication of the first signal based at least in part on completion of a corresponding task by the second hardware accelerator set.

13. The data processing device of claim 11, wherein:
the first signal is a first pending signal;
the first hardware task scheduler circuit includes an input configured to receive a second pending signal; and
the first hardware task scheduler circuit is configured to cause the one or more hardware accelerators of the first hardware accelerator set to start execution of the one or more first tasks based on the second pending signal.

14. The data processing device of claim 11, wherein the data processing device is comprised in a multiprocessor system-on-a-chip.

15. The data processing device of claim 11, wherein one or more of the first, second, and third hardware accelerator sets is a processor and is configured to perform a corresponding task that comprises executing software instructions.

16. The data processing device of claim 11, wherein the third hardware accelerator set is subsequent to the first and second hardware accelerator sets in a pipeline.

17. A method for executing concurrent threads using a scheduler circuit comprising first, second, and third hardware task scheduler circuits, comprised in a data processing device comprising first, second, and third hardware accelerator sets, wherein each of the first, second, and third hardware accelerator sets include one or more hardware accelerators, the method comprising:
configuring a first thread on the first hardware task scheduler circuit, wherein the first hardware task scheduler circuit is coupled with, and configured to control, the first hardware accelerator set;
configuring a second thread on the second hardware task scheduler circuit, wherein the second hardware task scheduler circuit is coupled with, and configured to control, the second hardware accelerator set;
initiating execution of the first thread by the first hardware task scheduler circuit;
concurrently initiating execution of the second thread by the second hardware task scheduler circuit;
determining that a first set of data produced by the first hardware accelerator set is available for use by the second hardware accelerator set;
using a first blocking circuit of the first hardware task scheduler circuit, inhibiting communication of a first signal that indicates that the first set of data is available until completion of the second hardware accelerator set;
determining that a second set of data produced by the second hardware accelerator set is available for use by the third hardware accelerator set; and
using a second blocking circuit of the second hardware task scheduler circuit, inhibiting communication of a second signal that indicates that the second set of data is available until completion of the third hardware accelerator set.

18. The method of claim 17 further comprising:
using a clear block pending circuit, causing the first blocking circuit to stop inhibiting the communication of the first signal based at least in part on completion of the second hardware accelerator set.

19. The method of claim 17, wherein one or more of the first, second, and third hardware accelerator sets is a processor and a respective one of the first thread or the second thread comprises executing software instructions.

20. The method of claim 17, wherein the third hardware accelerator set is subsequent to the first and second hardware accelerator sets in a pipeline.

* * * * *